Sept. 20, 1938. J. J. KANE 2,130,587
WELL PIPE JOINT
Filed Nov. 20, 1936
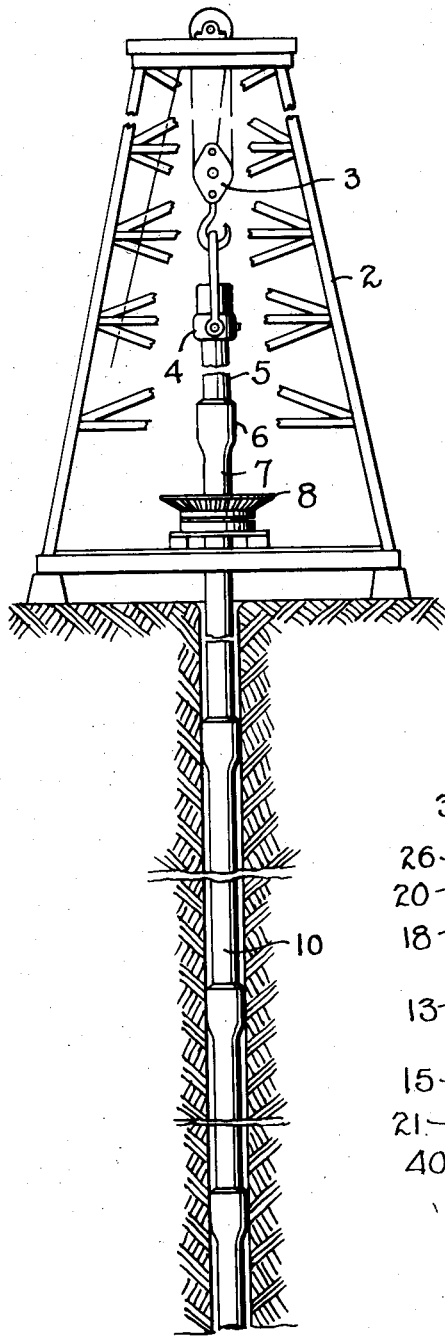
Fig. 1.
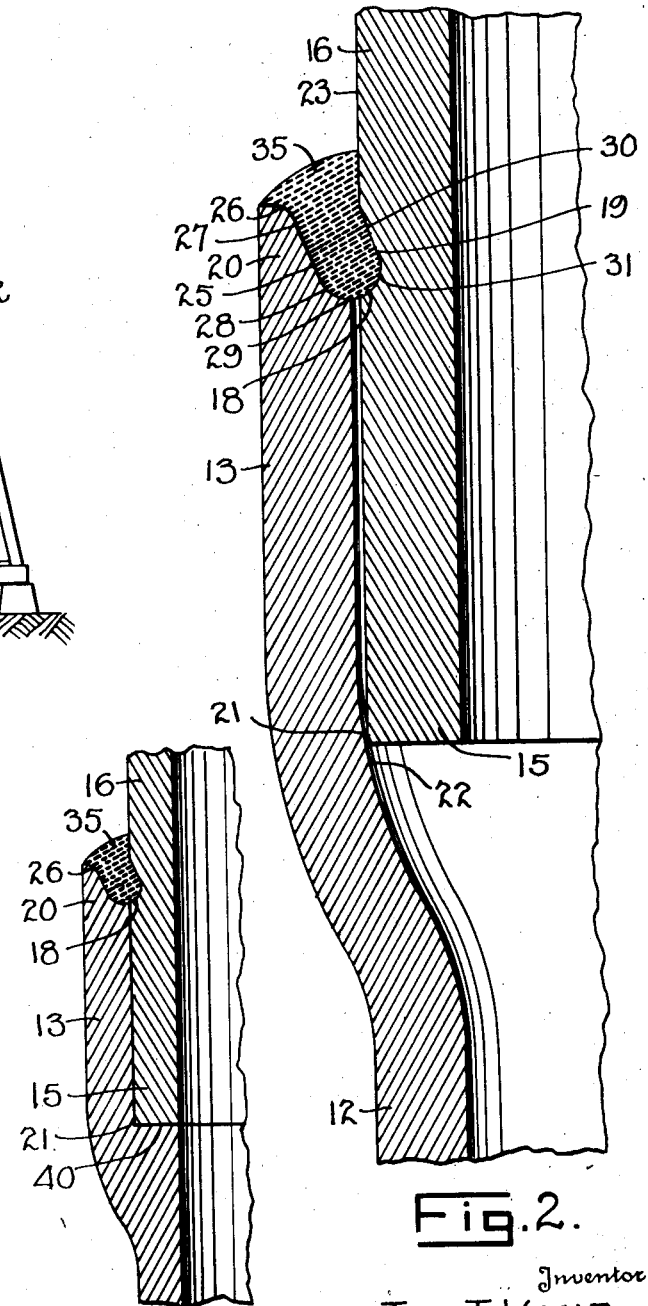
Fig. 2.
Fig. 3.
Inventor
JOS. J. KANE.
Jesse R. Stone
Lester B Clark
By
Attorneys Patented Sept. 20, 1938

2,130,587

UNITED STATES PATENT OFFICE 2,130,587

WELL PIPE JOINT

Joseph J. Kane, Galveston, Tex.

Application November 20, 1936, Serial No. 111,778

8 Claims. (Cl. 285—115)

The invention relates to a well pipe joint of the type which is to be embodied in the connection between two adjacent sections of pipe as the pipe is being lowered into the well bore.

In the drilling of wells it is desirable to provide one or more strings of pipe in the well to serve as a casing for the well bore and to also conduct the oil from the well. These strings of pipe must be lowered into the well bore in a suspended position and it is therefore necessary to provide a joint or connection between the sections of pipe which will have a strength at least equal to and preferably greater than the strength of the pipe in tension.

The invention relates generally to the type of pipe setting operation and method therefore which is disclosed in my prior Patent 1,966,248, granted July 10, 1934, as well as the copending application Serial No. 15,202, filed April 8, 1935, in which I am a joint inventor.

It has been found that it is desirable to provide a joint or connection between the sections of pipe which can be quickly formed by the welding operation and in which a minimum number of passes are to be made around the pipe by the welder in forming the joint.

Another object of the invention is to provide a joint which will present a strength in shear which is greater than the strength in tension of the material which makes up the pipe.

Another object of the invention is to provide a pocket which is located between the upper end of the lower section of pipe and the outside surface of the upper section of pipe which is of a size and configuration which will receive a band of welding material which will have a greater strength in shear than the pipe will have in tension.

Another object of the invention is to provide an undercut end on a pipe section so as to provide a pocket which will receive a bead of welding material and confine the same in order to form a pipe joint.

Another object of the invention is to provide a pocket between adjacent pipe sections so that a band of welding material may be deposited therein which will be of a configuration such that the band of material will be subjected to a shearing stress in order to support the load of the string of pipe.

Another object of the invention is to provide a pocket of welding material between two adjacent pipe sections so that part of the pocket is formed in each of the pipe sections.

Another object of the invention is to provide a beveled end on the pipe section which has a reverse curve configuration.

Another object of the invention is to provide a beveled end on a pipe section which has an ogee curvature.

Another object of the invention is to provide a pipe connection in which a depression is formed in the periphery of the spigot end of a bell and spigot joint so that a band of welding material may be deposited in the depression.

Another object of the invention is to provide a pocket for the band of welding material in the pipe joint connection which is of a depth at least equal to the thickness of the material in the pipe.

Another object of the invention is to provide a pipe joint which is of a size and configuration such that the welding rod may be inserted therein in order to deposit molten metal at the bottom of the pocket when the first pass is being made by the welder.

Another object is to provide a joint which is subjected to a combination tension and shearing stress.

Other and further objects of the invention will be readily apparent when the following description is considered in connection with the accompanying drawing, wherein:

Fig. 1 shows a diagrammatic arrangement of a string of pipe being lowered into the well bore in order to illustrate an application of the invention.

Fig. 2 is an enlarged broken detail sectional view of a bell and spigot connection to which the invention has been applied.

Fig. 3 shows a modified form of the pipe joint connection wherein a shoulder is provided for the abutment of the pipe sections.

It is to be distinctly understood that the invention may be applied to any size, thickness or weight of pipe and that the construction, arrangement, configuration and size of the band of welding material and the pocket which is to receive the same will be proportioned in accordance with the variation in the size, strength and weight of the pipe, as well as the length of the pipe which is to be assembled.

In assembling and lowering the string of pipe into a well bore it is imperative that the sections of pipe be quickly assembled and lowered into the well because the pipe is usually positioned in the well at a critical period when it is desirable to either continue the drilling if it is the surface casing which is being set or to complete the well and place it on production if it is the oil string of pipe which is being set. It is therefore of utmost importance to be able to assemble the successive pipe joints as quickly and accurately as possible when the strength of the pipe joint to be provided is considered.

In view of the fact that the string of pipe is suspended in the well bore which has been previously drilled it is absolutely necessary that a strong and safe joint be provided which is capable of suspending a string of pipe having a weight which will develop the full tensile strength of the material which makes up the section of pipe.

It seems obvious that in determining the strength, weight and thickness of the pipe which is to be used in setting a string of pipe of the type used in wells that a proper strength pipe will be elected which will be capable of suspending the weight of all of the pipe sections which go to make up the entire string of pipe because the last section positioned is of course used to suspend the entire string which has previously been lowered into the well bore and each pipe joint must serve to transfer the weight of the string of pipe below that joint to the next succeeding joint above.

The present invention concerns itself with providing a joint between two adjacent sections of pipe which will develop a strength when subjected to a stress which is a combination of shear and tension, which will be greater than the strength of the material making up the pipe section when that material is subjected to tension. This is necessary because naturally the material of the pipe when it supports the sections of pipe below it is subjected to tension. On the other hand, the material which makes up the pipe joint is not in direct tension because it must transfer the strength laterally from the bell of the lower pipe section to the spigot of the upper pipe section. This transfer is of course accomplished due to the bond of the welding material with the end of the bell section and the periphery of the spigot section. The welding material itself, however, is subjected to a combination shearing stress and tension stress, and the present joint has therefore been devised with a view of providing such a joint as will resist such a stress and which, at the same time, can be quickly and economically formed in order to provide the desired bond between the pipes and the welding material.

In Fig. 1 the derrick usually present on the well is indicated at 2 and the hoisting equipment 3 by means of elevators 4 and the upper pipe section 5 is supported, and the lower spigot end thereof is inserted in the bell 6 of the lower pipe section 7. While this operation is being carried out the section 7 is usually supported in the rotary table 8 or in the usual well head equipment by means of a set of slips or other supporting members which are well known in the art. As the pipe sections are assembled end to end and attached by welding the string of pipe 10 is gradually lowered into the well bore and it seems obvious that all of the sections of pipe must be supported by the last attached or uppermost section of pipe. In view of this enormous load which must be carried by each pipe joint and the fact that a pipe joint must be provided which is fluid tight the present form of pipe joint has been conceived.

Fig. 2 shows a magnified section of pipe connection so that the detailed configuration of the pocket and the arrangement of the parts can be described in detail. This view shows the lowermost pipe section 12 as being provided with a bell portion 13 which has received the spigot portion 15 of the upper section of pipe 16. These pipe sections 12 and 16 have been formed prior to their assembly in such a manner that when they are properly arranged a pocket 18 is provided. The spigot 15 of the pipe section 16 has preferably been provided with a rounded groove or annular channel 19 in its periphery a suitable distance above the lower end of the pipe so that it will come abreast of the upper end 20 of the bell 13 on the lowermost pipe section 12. When the spigot end 15 has moved into the bell end 13 of course it moves downwardly until the corner of the shoulder 21 engages the inner surface 22 of the bell, and the groove 19 can therefore be formed in the periphery 23 of this spigot 15 at the desired distance from the shoulder 21 so that it will be properly positioned when the weld is to be made. The upper end of the bell 13 is beveled by being undercut and this bevel, indicated generally at 25, is of a special configuration in order to provide a pocket of a desired shape, size and configuration such that the desired joint will be formed. The bevel here shown is in the form of an ogee curve so as to provide a reverse curve on the body of material at the extreme end 26 of the pipe. This body or lip 26 is provided so that the heat of the welding operation will not cause it to melt away but will insure that the welding material can be deposited without melting away the upper portion of the pocket. In practice if this lip 26 melts away during the welding operation it is possible that the band of welding material, while still in a molten state, will run out at the melted away area and result in an imperfect joint.

The bevel 25 extends downwardly and inwardly on a substantially straight line as at 27 and terminates at its lower end in an internally curved portion 28 to provide the lowermost shoulder 29 which cooperates with the recess or channel 19 in order to form the pocket 18.

The recess 19 has a substantially straight, inwardly and downwardly directed face 30 which merges with the curved portion 31 so that the shoulder of the pocket 18 is a substantial semicircle with the substantially parallel side walls 27 and 30.

It is to be understood that this pocket 18 will be of a suitable depth and width, depending upon the thickness, weight and strength of the pipe embodied such that when the band of welding material 35 is deposited that the band of welding material will provide a strength greater than the strength of the wall of the pipe. The depth and configuration of the band of welding material 35 may also depend upon the quality or strength of the particular welding material to be employed, it being obvious that if a welding material having a low ultimate strength is used a greater amount of welding material will be necessary than if a material having a higher maximum strength is used.

It will be understood that there are three essential requisites of a welded joint of this sort, and these are: (1) to deposit a minimum amount of material; (2) to provide a maximum adhesion or bonded surface; and (3) to be able to use high welding heat with a type of joint which will permit such heat to be used, and which will allow the weld to be completed within the shortest possible time.

The foregoing three requisites are necessary because of cost, speed of operation and necessary strength and will of course vary with the material used and the conditions and circumstances under which the joint is being presented.

It is desirable in making a joint of this type to have the pocket 18 of a size and shape such that the welding rod itself can be inserted deeply into the pocket so that the welder may deposit the initial band of welding material in the bottom of the pocket and also that the walls 27 and 19 of the pocket will become sufficiently heated and semi-molten, so that they will bond with the body of welding material 35. In this manner the first band of material can be quickly deposited because the rod is closely adjacent the area where the deposit is to be made, whereas, if the pocket were of a shape such that the welding rod could not be inserted into the pocket then it would be necessary to melt the metal at the top of the pocket and allow it to drop into the pocket.

While this operation is of course instantaneous it would result in a deposit of the material in such a manner that a substantial bond would not be formed between the pipe and the metal.

The depth of the pocket 18 is preferably such that when the body 35 of welding material is in position that there will be sufficient welding material present to present a stress in shear along a line which is upwardly and outwardly inclined through the body of welding material in a plane substantially parallel with the faces 27 and 30, because it has been found that this is the plane of the well which is subjected to shear, it being understood that the pull between the two pipe joints subjects the welding material to a combination shearing and tensile stress rather than to a direct tensile stress such as that to which the material of the pipe is subjected.

No particular angle with respect to the vertical can be ascribed to the pocket walls 27 and 30 because this will vary in accordance with the thickness of the pipe and the stress of not only the pipe material but the welding material as well.

In analyzing the application of the stress to the welding material it will be seen that the stress transfer is along the center line of the material of the pipe until the pipe bells out. Then, however, there is a tendency for the curvature forming the bell to straighten out under the load. This tendency is resisted by the bell moving in until it abuts the corner of the lower end of the spigot which then acts as a fulcrum so that the top of the bell has a tendency to be pried outwardly away from the joint. The application of stress to the joint is thus a combination stress which is partly shear due to the load and partly tension due to the pull of the bell away from the spigot.

The resultant stress line which may be termed the major axis will therefore be along a diagonal from the base of the weld at 18 to the crest thereof where the numeral 35 is applied on the drawing. The minor axis will be transverse to it.

The provision of the recess or groove 19 allows some of the welding material 35 to enter the contour of the spigot 15 so that it serves as a positive wedge between the bell and the spigot in order to firmly anchor the parts in position. Thus, in event there should not be a complete and perfect bond formed between the welding material 35 and the surface 30, nevertheless a strong and secure joint would be provided because once the welding material solidifies the spigot 15 could not be pulled out of the bell 13 except by shearing off the welding material which had been inserted in the recess 19.

Fig. 3 shows a slightly modified form of the pipe construction wherein the bell 13 has been formed with a shoulder 40 against which the shoulder 21 of the spigot end 15 will abut. This insures an exact alignment of the pipe sections so that the pocket will be accurately aligned and the deposit of welding material insured. This kind of a joint may be used on the utmost sections of a string of pipe 10 where it is contemplated that a spudding of the string of pipe may be necessary in order to force it into the well bore, because a joint like this is adapted to transmit compressive as well as tensile stress.

It is to be understood that this invention broadly contemplates a band of welding material which will be capable of transmitting a stress at least equal to the tensile stress of the pipe and which can be formed by a deposit of minimum material at a high heat while still providing a maximum adhesion surface so that the material will be subjected to a combination shear and tension.

What is claimed is:

1. A pipe joint for well casing comprising a bell and spigot connection, the end of said bell comprising a downwardly and inwardly directed ogee curve, the periphery of the spigot comprising an annular recessed portion positioned within said curve when the joint is assembled whereby a pocket is formed by the curve and the recess, and welding material disposed in said pocket.

2. A pipe section to be assembled in a well bore including a bell member whose end is formed to receive welding material and comprises a downwardly and inwardly reverse curve.

3. A pipe section to be assembled in a well bore including a spigot which is formed to receive welding material and comprises an annular groove spaced from the end of the pipe section.

4. In a pipe joint for well casing, where the joint is formed by welding the sections together in an upright position, an undercut bevel on the upper end of the lower pipe section, said bevel comprising a surface which is curved to provide a thick outer lip which is adapted to absorb the heat of the welding operation without melting down.

5. In a pipe joint for well casing, where the joint is formed by welding the sections together in an upright position, an undercut bevel on the upper end of the lower pipe section, said bevel comprising a surface which is curved to provide a thick outer lip which is adapted to absorb the heat of the welding operation without melting down, and a recessed area on the periphery of the lower end of the uppermost section within the bevel on said lower section, said bevel and recess cooperation to form a pocket to receive welding material.

6. A pipe joint for connecting sections of pipe together where the string of pipe is to be suspended in vertical position so that the pipe joint is subjected to a stress due to the weight of the entire string of pipe which comprises a bell and spigot arrangement, and a recessed area on each said bell and said spigot arranged to form a pocket when the bell and spigot are assembled, and a body of welding material disposed therein so that such material is subjected to a shearing stress.

7. A pipe joint for connecting sections of pipe together where the string of pipe is to be suspended in vertical position so that the pipe joint is subjected to a stress due to the weight of the entire string of pipe which comprises a bell and spigot arrangement, and a recessed area on each said bell and said spigot to form a pocket, said area including a bevel on said bell and a recess on said spigot which are aligned with the recess on the spigot within said bevel, and a body of welding material disposed therein so that such material is subjected to a shearing stress, said recess and the body of welding material being of a size and configuration such that it will develop a strength in shear at least equal to the tensile strength of the pipe section.

8. A welded joint for well pipe comprising a bell and spigot joint, a band of welding material joining the pipes of said joint which has an upright outwardly inclined major axis which is greater than its transversely downwardly inclined minor axis.

JOSEPH J. KANE.